(12) United States Patent
Choi

(10) Patent No.: US 7,437,122 B2
(45) Date of Patent: Oct. 14, 2008

(54) APPARATUS AND METHOD FOR TURNING WIRELESS TV ON/OFF

(75) Inventor: Jae Young Choi, Gyeongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 457 days.

(21) Appl. No.: 11/214,836

(22) Filed: Aug. 31, 2005

(65) Prior Publication Data

US 2006/0046791 A1    Mar. 2, 2006

(30) Foreign Application Priority Data

Sep. 2, 2004    (KR) .................. 10-2004-0070093

(51) Int. Cl.
  *H04B 3/36* (2006.01)
(52) U.S. Cl. .................. 455/7; 455/11.1; 455/13.1; 455/73; 725/87; 381/81
(58) Field of Classification Search .............. 455/7, 455/11.1, 13.1, 73; 725/87; 381/81
See application file for complete search history.

(56) References Cited

U.S. PATENT DOCUMENTS

| | | | | |
|---|---|---|---|---|
| 5,297,211 | A * | 3/1994 | Noro | 381/81 |
| 6,538,556 | B1 * | 3/2003 | Kawajiri | 340/3.2 |
| 2002/0162112 | A1 * | 10/2002 | Javed | 725/87 |
| 2004/0239520 | A1 * | 12/2004 | Seo | 340/825.71 |
| 2006/0031438 | A1 * | 2/2006 | Tokuhashi et al. | 709/223 |

* cited by examiner

Primary Examiner—Sanh D Phu
(74) Attorney, Agent, or Firm—Birch, Stewart, Kolasch & Birch, LLP

(57) ABSTRACT

An apparatus and method for turning on/off a wireless display device, are provided. The apparatus includes a transmitter to receive image signals to be displayed on the wireless display device and to transmit the received image signals via wireless communication, and a receiver to receive the image signals transmitted from the transmitter and to display the image signals on a screen of the wireless display device. The transmitter and the receiver are turned on/off automatically in response to an on/off signal from a remote controller.

20 Claims, 3 Drawing Sheets

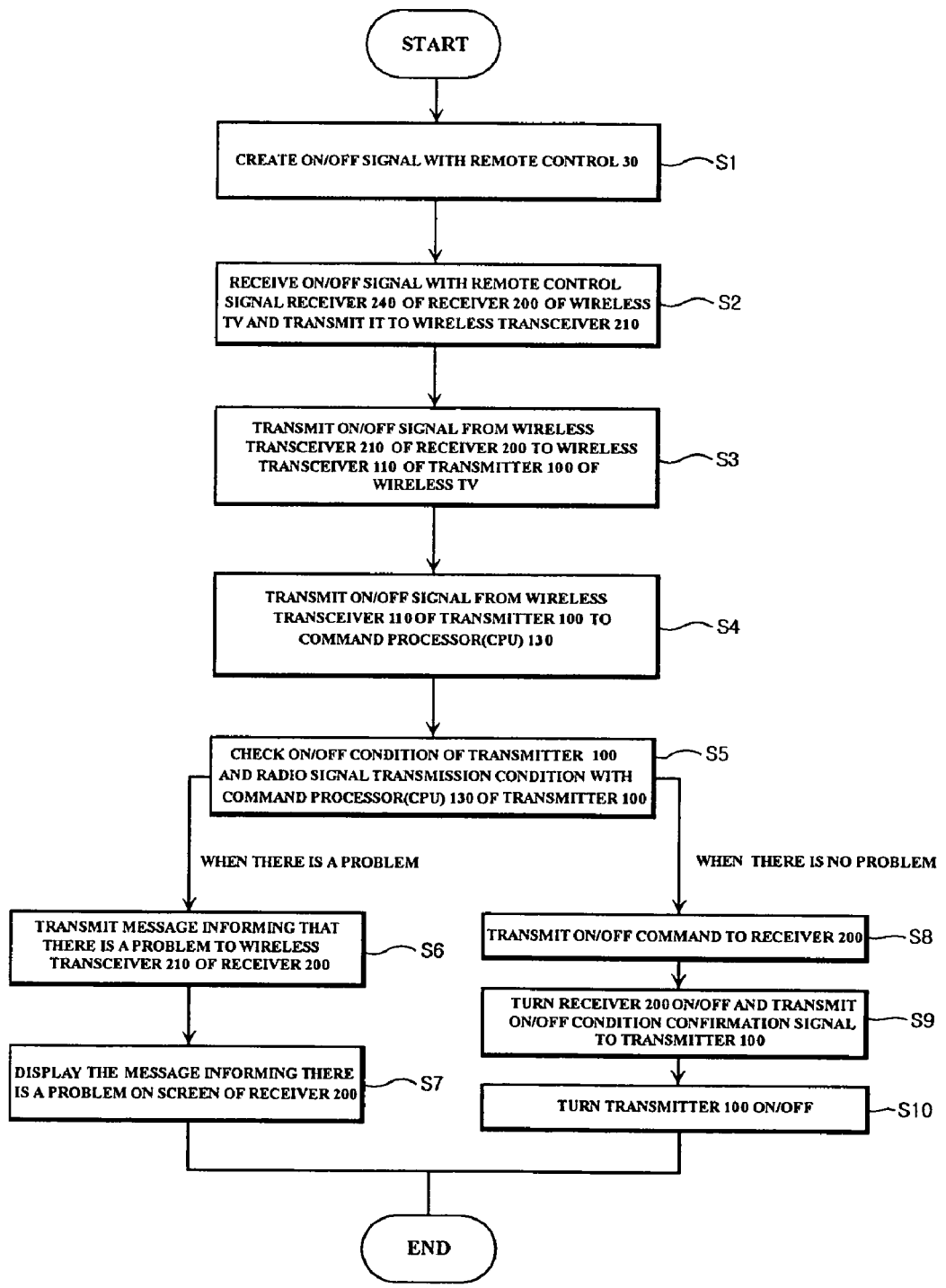

APPARATUS AND METHOD FOR TURNING WIRELESS TV ON/OFF

This application claims the benefit of the Korean Patent Application No. 10-2004-0070093 filed in Republic of Korea on Sep. 2, 2004, which is hereby incorporated by reference.

BACKGROUND OF THE INVENTION

1. Field of the Invention

The present invention relates generally to an apparatus and a method for turning a wireless TV on/off, and more particularly, to an apparatus and a method for turning both the transmitter and receiver of a wireless TV on/off with a single operation of a remote control.

2. Description of the Related Art

In a broader sense, a wireless TV refers to a TV which can be installed anywhere regardless of electricity, cables, and antenna wires, as in the case of a conventional wireless appliance. In a narrower sense, a wireless TV refers to a TV having a screen separated from the body and operated wirelessly. The present invention will be described later based on the latter sense.

A wireless TV includes both a transmitter and a receiver. The transmitter corresponds to the body of the TV and is adapted to receive ground waves from broadcasting stations or satellite broadcasting signals and perform necessary signal processing. The transmitter is connected via wires to an antenna for receiving ground waves from broadcasting stations or satellite broadcasting signals or to a cable for cable TV and is fixedly installed in a specific position. The receiver corresponds to the screen of the TV and is adapted to receive broadcasting signals from the transmitter and display them on the screen. The receiver performs wireless communication with the transmitter via a wireless LAN and is freely positioned anywhere within a signal radius without being fixed in a specific position. The receiver receives broadcasting signals, including video signals, and control signals for controlling the operation of the receiver from the transmitter and displays the broadcasting signals.

As briefly shown in FIG. 1, a wireless TV according to a related art includes a transmitter (Tx) 10, a receiver (Rx) 20, and a remote control 30 used to adjust the channel and volume of the TV. The signals generated by the remote control 30 may be RF signals. As shown in the block diagram of FIG. 2, the transmitter 10 and receiver 20 transmit and receive broadcasting signals and control signals via wireless transceivers 11 and 21, such as wireless LANs. The broadcasting signals include video and audio signals regarding the contents of broadcasting programs and the control signals are composed of preset codes for control.

Referring to FIG. 2, the procedure for tuning the wireless TV on/off according to the related art will now be described. When the remote control 30 transmits an on/off signal while the transmitter 10 and the receiver 20 of the wireless TV are in normal operation, a remote control signal receiver 24 of the receiver 20 receives the on/off signal and sends it to a power controller 22 of the receiver 20, which is turned on/off accordingly. As such, the on/off command from the remote control 30 can turn the receiver 20 on/off, but not the transmitter 10, according to the related art.

That is, in the related art, the control signals transmitted and received between the transmitter 10 and receiver 20 of the wireless TV do not include a signal for turning the power on/off. The transmitter 10 and receiver 20 are separately turned on/off by their own power controllers 12 and 22. When the user wants to turn the wireless TV off, he can turn the receiver 20 off with the remote control 30, but not the transmitter 10. Instead, he must approach the transmitter 10 and switch it off. Suppose that the transmitter 10 of the wireless TV is installed in the bedroom and the receiver 20 is located in the living room. When the user wants to turn the TV off while watching it in the living room, he must turn the receiver 20 off with the remote control 30 and then move into the bedroom to turn the transmitter 10 off. Otherwise, only the receiver 20 is turned off and the transmitter 10 is still turned on. This unnecessarily wastes power and is inconvenient to the user.

When the transmitter 10 is turned on and the receiver 20 is off, it is not certain whether or not the transmitter 10 transmits radio signals but the screen does not display images. In either case, in the related art, it is impossible to turn both the transmitter 10 and receiver 20 off with a single operation of the remote control and the user must approach the transmitter 10 to manually turn it off to avoid unnecessary power consumption.

SUMMARY OF THE INVENTION

Accordingly, the present invention is directed to an apparatus and method for controlling both a transmitter and a receiver of a wireless TV that substantially obviates one or more problems due to limitations and disadvantages of the related art.

It is an object of the present invention to provide an apparatus and a method for turning both a transmitter and a receiver of a wireless TV on/off with a single operation of a remote control.

More particularly, in the case of a related art wireless TV, the receiver can be turned on/off by an on/off signal from the remote control, but not the transmitter. Instead, the user must inconveniently approach the transmitter and manually switch it off. The present invention corrects this problem by allowing both the transmitter and receiver of a wireless TV to be turned on/off with a single on/off operation of the remote control or the like.

It is another object of the present invention to provide an apparatus and a method for controlling both the transmitter and receiver of a wireless TV to be turned on/off with the transmitter which receives an on/off command from a remote control.

More particularly, in the case of a conventional wireless TV, the receiver is turned on/off as it directly responses to an on/off signal from the remote control. According to an embodiment of the present invention, both the receiver and transmitter are turned on/off in response to an on/off command from a command processor of the transmitter, which is adapted to receive an on/off signal from the remote control via a wireless transceiver of the receiver.

To achieve these objects and other advantages in accordance with the purpose of the invention, as embodied and broadly described herein, there is provided according to an aspect of the present invention an apparatus for turning a wireless TV on/off including a transmitter for receiving external signals via a cord while being fixed in a specific position; a receiver for receiving signals transmitted from the transmitter via wireless communication and displaying them without being fixed in a specific position; and a remote control for controlling the operation of the receiver in a remote place, wherein the receiver is adapted to be turned on/off by an on/off command from the transmitter, without being turned on/off in direct response to an on/off command from the remote control, and the transmitter is adapted to be turned on/off in response to an on/off condition confirmation signal from the receiver so that both transmitter and receiver are turned on/off by the on/off command from the remote control.

According to an aspect of the invention, the transmitter includes a command processor for receiving the on/off command of the remote control from the receiver, checking any problem with the on/off condition of the transmitter and the radio signal transmission condition, and transmitting an on/off command to the receiver according to the check result; a power controller for controlling the transmitter to be turned on/off in response to the on/off condition confirmation signal from the receiver; and a wireless transceiver for receiving the on/off command of the remote control and the on/off condition confirmation signal from the receiver and transmitting the on/off command from the command processor to the receiver.

According to an aspect of the invention, the command processor is adapted to send the on/off command to the receiver so that it is controlled to be turned on/off, when no problem is checked with the on/off condition of the transmitter and the radio signal transmission condition, and receive the on/off condition confirmation signal from the receiver so that the transmitter is controlled to be turned on/off.

According to an aspect of the invention, the receiver is adapted to be controlled to display a message which informs that there is a problem with the receiver when a problem is checked with the on/off condition of the transmitter and the radio signal transmission condition. The receiver includes a remote control signal receiver for receiving the on/off command from the remote control; a power controller for controlling the receiver to be turned on/off according to the on/off command from the transmitter; and a wireless transceiver for wirelessly transmitting/receiving the on/off command from the transmitter and the on/off condition confirmation signal.

According to an aspect of the invention, the wireless transceiver of the receiver is adapted to receive the on/off command from the remote control signal receiver and transmit it to the transmitter, to receive the on/off command from the transmitter and send it to the power controller so that the receiver is turned on/off, and to receive the on/off condition confirmation signal from the power controller and transmit it to the transmitter.

According to another aspect of the present invention, there is provided a method for turning a wireless TV on/off having a transmitter for receiving external signals via a cord while being fixed in a specific position, a receiver for receiving signals transmitted from the transmitter via wireless communication and displaying them without being fixed in a specific position, and a remote control for controlling the operation of the receiver in a remote place, the method including the steps of: creating an on/off command with the remote control; receiving the on/off command from the remote control with the receiver and transmitting it to the transmitter; checking any problem with the on/off condition of the transmitter and the radio signal transmission condition with the transmitter; and controlling both transmitter and receiver to be turned on/off with the transmitter when no problem is checked.

According to another aspect of the invention, there is provided an apparatus for turning on/off a wireless display device, the apparatus comprising: a transmitter to receive image signals to be displayed on the wireless display device and to transmit the received image signals via wireless communication; and a receiver to receive the image signals transmitted from the transmitter and to display the image signals on a screen of the wireless display device, wherein the transmitter and the receiver are turned on/off automatically in response to an on/off signal from a remote controller.

According to another aspect of the invention, there is provided a transmitter for a wireless display device including a remote controller and a receiver, the transmitter comprising: a command processor to receive an on/off signal from the remote controller, to check a condition of the transmitter in response to the on/off signal, and to wirelessly transmit a receiver on/off command according to the checked result; and a power controller to control the transmitter to be turned on/off in response to a receiver on/off confirmation signal from the receiver.

According to another aspect of the invention, there is provided a receiver for a wireless display device including a remote controller and a transmitter, the receiver comprising: a wireless transceiver to receive an on/off signal from the remote controller, to wirelessly transmit the on/off signal to the transmitter, and to receive a receiver on/off command from the transmitter; and a power controller to control the receiver to be turned on/off according to the on/off command from the transmitter.

According to another aspect of the invention, there is provided a method for turning on/off a wireless display device, the wireless display device including a transmitter, a receiver, and a remote controller, the transmitter configured to receive image signals to be displayed on the wireless display device and to transmit the received image signals via wireless communication, the receiver configured to receive the image signals transmitted from the transmitter and to display the image signals on a screen of the wireless display device, the method comprising: automatically turning on/off the transmitter and the receiver in response to an on/off signal from the remote controller.

According to another aspect of the invention, there is provided a method at a transmitter side for controlling a wireless display device including a remote controller, a transmitter and a receiver, the method comprising: receiving an on/off signal from the remote controller; checking a condition of the transmitter in response to the on/off signal, and wirelessly transmitting a receiver on/off command according to the checked result; and controlling the transmitter to be turned on/off in response to a receiver on/off confirmation signal.

According to another aspect of the invention, there is provided a method at a receiver side for controlling a wireless display device including a remote controller, a transmitter and a receiver, the method comprising: receiving an on/off signal from the remote controller; wirelessly transmitting the on/off signal to the transmitter; receiving a receiver on/off command from the transmitter in response to the transmitted on/off signal; and controlling the receiver to be turned on/off according to the on/off command.

Additional advantages, objects, and features of the invention will be set forth in part in the description which follows and in part will become apparent to those having ordinary skill in the art upon examination of the following or may be learned by practicing the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a flowchart showing a procedure of turning off a transmitter and a receiver of a wireless TV according to the present invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Although the present invention will be described with reference to a case wherein the frequency band of the remote control signals corresponds to that of IR signals, the present invention can also be applied to other cases wherein other signals, for example, RF signals are used.

Hereinafter, the embodiments of the present invention will be explained with reference to the accompanying drawings.

The present invention proposes a construction which makes it possible to turn not only the receiver on/off, but also the transmitter of a wireless TV with a single on/off command from a remote control of the wireless TV. Although the wireless TV is discussed, the inventive concepts of the present invention are applicable to other devices such as wireless display devices, etc.

Figure 1:
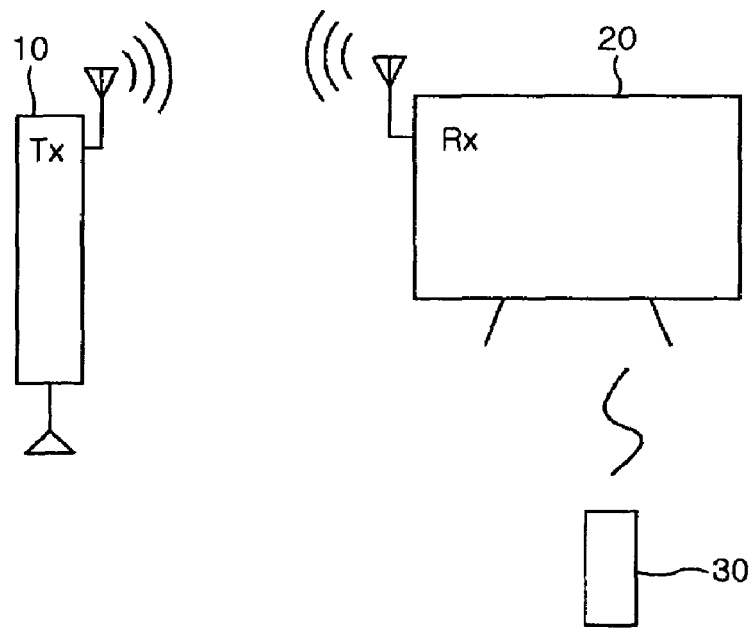
FIG. 1 briefly shows a transmitter, a receiver, and a remote control of a wireless TV according to a related art.
Figure 2:
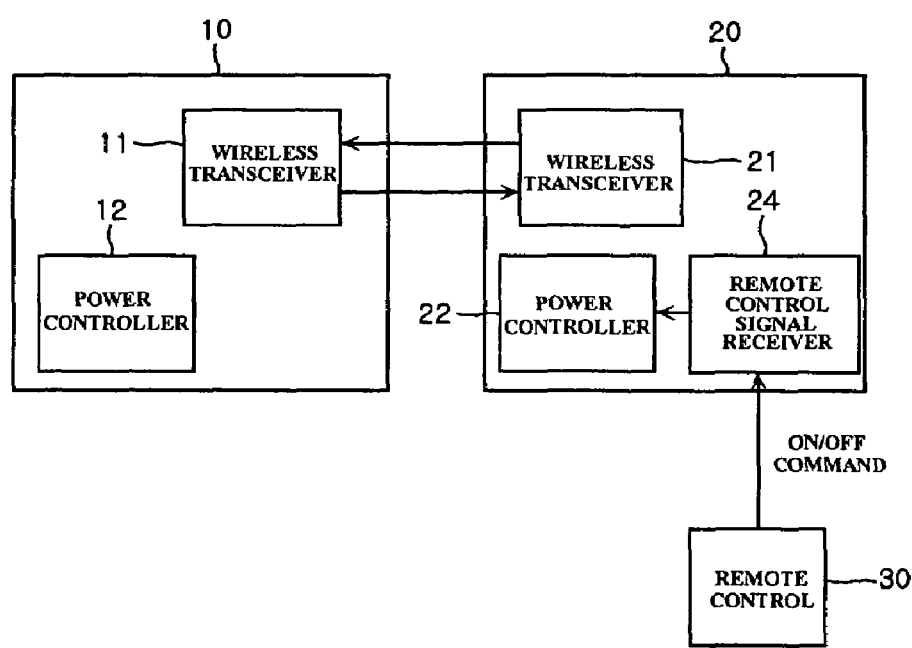
FIG. 2 is a block diagram showing the detailed construction of the transmitter, the receiver, and the remote control of the wireless TV according to the related art, regarding the processing of an on/off command, and the flow of the on/off command.
Figure 3:
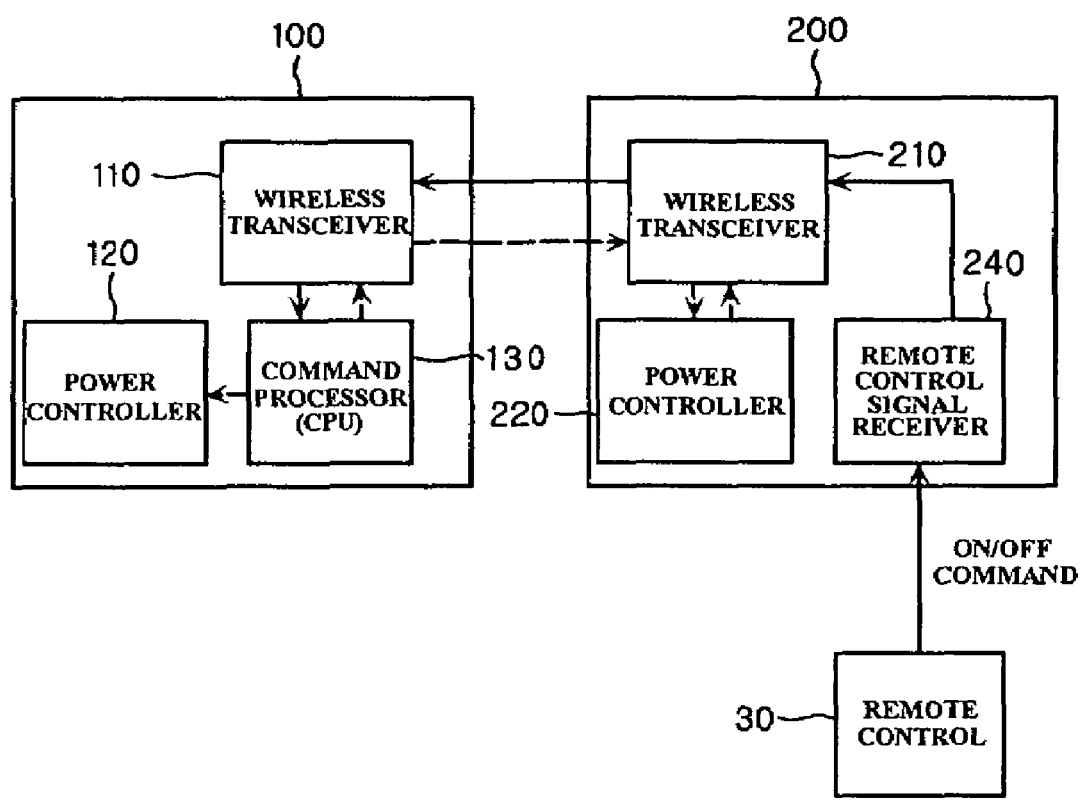
FIG. 3 is a block diagram showing the detailed construction of a transmitter, a receiver, and a remote control of a wireless TV according to the present invention, regarding the processing of an on/off command, and the flow of the on/off command.

FIG. 3 is a block diagram showing a transmitter 100, a receiver 200, and a remote control (or remote controller) 30 of a wireless TV according to an embodiment of the present invention. All the components of the wireless TV are operatively coupled.

Referring to FIG. 3, an on/off command from the remote control 30 is received by a remote control signal receiver 240 of the receiver 200, and is sent to a wireless transceiver 210, not to a power controller 220, of the receiver 200. This is for the purpose of checking the power condition of the transmitter 100 before turning the receiver 200 on/off and, if there is no problem, turning the receiver 200 on/off under control of a command processor 130 of the transmitter 100.

After receiving the on/off signal, the wireless transceiver 210 of the receiver 200 sends it to a wireless transceiver 110 of the transmitter 100, which in response generates and then sends an on/off command to the command processor 130 of the transmitter 100. The command processor 130 of the transmitter 100 checks the power condition (on/off condition) of the transmitter 100 and the radio signal transmission condition of the wireless transceiver 110 (for example, wireless LAN). If there is no problem, the command processor 130 transmits the on/off command to the wireless transceiver 210 of the TV receiver 200 via the wireless transceiver 110 of the transmitter 100. If there is a problem with the power condition of the transmitter 100, the command processor 130 generates a message for notifying this problem, which is then transmitted to the wireless transceiver 210 of the TV receiver 200 (e.g., via the wireless transceiver 110) and is displayed on the screen of the receiver 200 (or of the wireless TV).

According to an embodiment of the present invention, the power condition of the transmitter 100 of the wireless TV and the operating condition of the wireless LAN are checked first and when there is no problem with them, then the receiver 200 is turned on/off. Thus, the receiver 200 is prevented from being turned on/off even when there is a problem with the transmitter 100. The screen of the receiver 200 displays messages regarding any problem associated with the turn on/off operations, so that the user can be easily informed of it and perform diagnosis and repair operations as needed.

As discussed above, when there is no problem with the power condition of the transmitter 100 of the wireless TV, the command processor 130 of the transmitter 100 sends an on/off command to the wireless transceiver 210 of the receiver 200 via the wireless transceiver 110. The wireless transceiver 210 of the receiver 200 then sends the on/off command to the power controller 220 of the receiver 200. Then the power controller 220 turns the receiver 200 on/off according to the received on/off command. Then, the power controller 220 generates an on/off condition confirmation signal, which is then sent to the wireless transceiver 110 of the transmitter 100 via the wireless transceiver 210 to inform that the receiver 200 has been turned on/off. This is for the purpose of guaranteeing that the transmitter 100 is turned on/off after the transmitter 100 checks the on/off condition confirmation signal, which indicates that the receiver 200 has been turned on/off.

That is, once the wireless transceiver 110 of the transmitter 100 receives the on/off condition confirmation signal, which indicates that the receiver 200 has been turned on/off, the wireless transceiver 110 sends the on/off condition confirmation signal to the command processor 130. In response to the confirmation signal, the command processor 130 then selectively controls the power controller 120 of the transmitter 100 to execute the corresponding on/off command to turn on/off the transmitter 100.

According to the present invention, the turning on/off of the receiver 200 or the transmitter 100 does not necessarily mean that all power to the receiver 200 and the transmitter 100 is off, but corresponds to being in a standby mode, which would be appreciated by one skilled in the art. As such, the remote control signal receiver 240, the wireless transceiver 210, the wireless transceiver 110 and the command processor 130 may be powered on throughout the turning on/off process of the present invention. What the power controllers 120 and 220 may turn off is elements/devices that require a significant amount of power, and not necessarily all the elements of the transmitter 100 and the receiver 200, respectively. For instance, in response to the off command, the power controller 120 may turn off the wireless TV screen, those elements associated with displaying images on the TV screen, producing audio, etc.

Thus, in the present invention, the power controller 220 of the receiver 200 turns the receiver 200 on/off according to the on/off command from the command processor 130 of the transmitter 100, not from the remote control 30. After confirming that the receiver 200 has been turned on/off, the power controller 120 of the transmitter 100 turns the transmitter 100 on/off.

FIG. 4 is a flowchart showing the procedure for turning a wireless TV on/off according to an embodiment of the present invention. This procedure can be implemented in the wireless TV of FIG. 3 or any other wireless TV or other suitable devices.

Referring to FIG. 4, the remote control 30 creates an on/off signal (step S1). The remote control signal receiver 240 of the receiver 200 of the wireless TV receives the on/off signal and transmits it to the wireless transceiver 210 (step S2). The wireless transceiver 210 of the receiver 200 transmits wirelessly the on/off signal to the wireless transceiver 110 of the transmitter 100 of the wireless TV wirelessly (step S3). The wireless transceiver 110 of the transmitter 100 then transmits the received on/off signal to the command processor (CPU) 130 (step S4). The command processor 130 of the transmitter 100 checks if there is a problem with the on/off condition of the transmitter 100 and the radio signal transmission condition of the wireless transceiver (wireless LAN) 110 (step S5).

If a problem is identified at step S5, a message notifying the problem in the transmitter 100 is generated by the command processor 130 and is transmitted to the wireless transceiver 210 of the receiver 200 via the wireless transceiver 110 (S6), and then the received message is displayed on the screen of the receiver 200 (step S7). Here this message can identify the exact problem or can just be a warning message. Also the message can be in any presentation form, e.g., text, graphics, icons, images, etc.

On the other hand, if no problem is identified at step S5, the command processor 130 of the transmitter 100 sends an on/off command to the wireless transceiver 210 of the receiver 200 via the wireless transceiver 110 (step S8). Here, this on/off command can be the received on/off command or can be newly generated by the command processor 130. The wireless transceiver 210 of the receiver 200 then receives the on/off command wirelessly and sends the received on/off command to the power controller 220 of the receiver 200, which is then turned on/off accordingly. The power controller 220 then generates an on/off condition confirmation signal, which informs that the receiver 200 has been turned on/off (i.e., in the standby mode), and sends the confirmation signal to the wireless transceiver 110 of the transmitter 100 via the wireless transceiver 210 (step S9). The wireless transceiver 110 of the transmitter 100 receives the on/off condition confirmation signal, which informs that the receiver 200 has been turned on/off, and sends it to the command processor 130. In response to the confirmation signal, the command processor 130 controls the power controller 120 of the transmitter 10 to execute the corresponding on/off command to turn on/off the transmitter 100 (i.e., to place it in the standby mode).

The present invention makes it possible to turn both the transmitter 100 and receiver 200 of a wireless TV on/off with a single operation of the remote control 30, so that the user does not need to inconveniently approach the transmitter 100, which is located outside a visible range, and manually switch it on/off.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for turning on/off a wireless display device, the apparatus comprising:
   a transmitter to receive image signals to be displayed on the wireless display device and to transmit the received image signals via wireless communication; and
   a receiver to receive the image signals transmitted from the transmitter and to display the image signals on a screen of the wireless display device,
   wherein the transmitter and the receiver are turned on/off automatically in response to an on/off signal from a remote controller, and the receiver is turned on/off by an on/off command from the transmitter without being turned on/off in direct response to the on/off signal from the remote controller.

2. The apparatus of claim 1, wherein the receiver transmits the on/off signal from the remote controller to the transmitter, and the transmitter checks a condition of the transmitter in response to the on/off signal and then generates the on/off command based on the checked result.

3. The apparatus of claim 1, wherein the receiver generates an on/off confirmation signal corresponding to the turned-on/off status of the receiver, and the transmitter is turned on/off in response to the on/off confirmation signal received from the receiver.

4. A transmitter for a wireless display device including a remote controller and a receiver, the transmitter comprising:
   a command processor to receive an on/off signal from the remote controller, to check a condition of the transmitter in response to the on/off signal, and to wirelessly transmit a receiver on/off command according to the checked result; and
   a power controller to control the transmitter to be turned on/off in response to a receiver on/off confirmation signal from the receiver,
   wherein the receiver is turned on/off by the on/off command from the transmitter without being turned on/off in direct response to the on/off signal from the remote controller.

5. The transmitter of claim 4, further comprising:
   a wireless transceiver to wirelessly receive the on/off signal and the receiver on/off confirmation signal from the receiver, and to wirelessly transmit the receiver on/off command to the receiver.

6. The transmitter of claim 4, wherein the command processor generates and transmits the receiver on/off command if the checked result indicates that there is no problem in the transmitter.

7. The transmitter of claim 4, wherein the command processor generates and transmits a message to the receiver if the checked result indicates that there is a problem in the transmitter.

8. The transmitter of claim 4, wherein the checked condition of the transmitter is at least one of the following: an on/off condition of the transmitter, and a radio signal transmission condition of the transmitter.

9. A receiver for a wireless display device including a remote controller and a transmitter, the receiver comprising:
   a wireless transceiver to receive an on/off signal from the remote controller, to wirelessly transmit the on/off signal to the transmitter, and to receive a receiver on/off command from the transmitter; and
   a power controller to control the receiver to be turned on/off according to the on/off command from the transmitter,
   wherein the receiver is turned on/off by the on/off command from the transmitter without being turned on/off in direct response to the on/off signal from the remote controller.

10. The receiver of claim 9, further comprising:
    a remote control signal receiver to receive the on/off signal directly from the remote controller and to transmit the on/off signal to the wireless transceiver.

11. The receiver of claim 9, wherein the wireless transceiver is configured to receive a message from the transmitter, the message indicating a problem in the transmitter and to be displayed on a screen associated with the wireless display device.

12. A method for turning on/off a wireless display device, the wireless display device including a transmitter, a receiver, and a remote controller, the transmitter configured to receive image signals to be displayed on the wireless display device and to transmit the received image signals via wireless communication, the receiver configured to receive the image signals transmitted from the transmitter and to display the image signals on a screen of the wireless display device, the method comprising:

automatically turning on/off the transmitter and the receiver in response to an on/off signal from the remote controller, wherein the receiver is turned on/off by an on/off command from the transmitter without being turned on/off in direct response to the on/off signal from the remote controller.

13. The method of claim 12, wherein the automatically tuning on/off step includes:

transmitting the on/off signal from the remote controller to the transmitter;

checking a condition of the transmitter in response to the on/off signal;

generating, by the transmitter, the on/off command based on the checked result; and turning on/off the receiver in response to the on/off command.

14. The method of claim 13, wherein the automatically turning on/off step further includes:

generating, by the receiver, an on/off confirmation signal corresponding to the turned-on/off status of the receiver; and turning on/off the transmitter in response to the on/off confirmation signal received from the receiver.

15. A method at a transmitter side for controlling a wireless display device including a remote controller, a transmitter and a receiver, the method comprising:

receiving an on/off signal from the remote controller;

checking a condition of the transmitter in response to the on/off signal, and wirelessly transmitting a receiver on/off command according to the checked result; and controlling the transmitter to be turned on/off in response to a receiver on/off confirmation signal, wherein the receiver is turned on/off by the on/off command from the transmitter without being turned on/off in direct response to the on/off signal from the remote controller.

16. The method of claim 15, wherein the transmitter generates and transmits the receiver on/off command if the checking step indicates that there is no problem in the transmitter.

17. The method of claim 15, wherein the transmitter generates and transmits a message to the receiver if the checking step indicates that there is a problem in the transmitter.

18. The method of claim 15, wherein in the checking step, the checked condition of the transmitter is at least one of the following: an on/off condition of the transmitter, and a radio signal transmission condition of the transmitter.

19. A method at a receiver side for controlling a wireless display device including a remote controller, a transmitter and a receiver, the method comprising:

receiving an on/off signal from the remote controller;

wirelessly transmitting the on/off signal to the transmitter;

receiving a receiver on/off command from the transmitter in response to the transmitted on/off signal; and controlling the receiver to be turned on/off according to the on/off command.

20. The method of claim 19, further comprising:

receiving a message from the transmitter, the message indicating a problem in the transmitter and to be displayed on a screen associated with the wireless display device.

* * * * *